US009876875B2

(12) United States Patent
Tran et al.

(10) Patent No.: US 9,876,875 B2
(45) Date of Patent: Jan. 23, 2018

(54) SYSTEM, METHOD AND DEVICE FOR PROVIDING CROWD-SOURCED, CLOUD-BASED CUSTOM TUNING FOR APPLICATIONS

(71) Applicant: Nvidia Corporation, Santa Clara, CA (US)

(72) Inventors: Tuan Tran, Stnta Clara, CA (US); Anssi Kallolahti, Helsinki (FI); Cathy Donovan, Santa Clara, CA (US); Steve Fuller, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 265 days.

(21) Appl. No.: 14/808,548

(22) Filed: Jul. 24, 2015

(65) Prior Publication Data

US 2017/0026486 A1    Jan. 26, 2017

(51) Int. Cl.
*H04L 29/08* (2006.01)
*H04L 29/06* (2006.01)

(52) U.S. Cl.
CPC ............ *H04L 67/303* (2013.01); *H04L 67/10* (2013.01); *H04L 67/42* (2013.01)

(58) Field of Classification Search
CPC ........ H04L 67/303; H04L 67/10; H04L 67/42
See application file for complete search history.

(56) References Cited

U.S. PATENT DOCUMENTS

| | | | | |
|---|---|---|---|---|
| 7,903,116 B1* | 3/2011 | Klock | ................. | G06F 1/3203 345/501 |
| 8,296,781 B1* | 10/2012 | Lebaredian | ......... | G06F 9/44505 700/28 |
| 2008/0226279 A1* | 9/2008 | Dey | ........................ | G03B 7/08 396/234 |
| 2010/0318994 A1* | 12/2010 | Holmberg | ........... | G06F 11/3433 718/100 |
| 2014/0129686 A1* | 5/2014 | Haemel | ............... | G06F 9/44505 709/220 |

* cited by examiner

*Primary Examiner* — Brian J Gillis
*Assistant Examiner* — Amy Ling
(74) *Attorney, Agent, or Firm* — Kevin Brown; Parker Justiss, P.C.

(57) ABSTRACT

Optimizing computing device application profiles. Receiving, from power-user computing devices, a set of user-based application profiles, each application profile including one or more device parameter settings associated with an application operable to run on the devices. Evaluating the set on an optimization server computer with an electronic processor operable to: calculate if a count of the profiles of the set exceeds a predefined minimum threshold count; calculate a variance for one of the device parameter settings of the set, if the count exceeds the minimum threshold count; calculate if the variance is below a predefined maximum threshold variance; calculate an optimal value for the one of the device parameter settings, if the variance is below the maximum threshold variance; and storing, in computer-readable storage media of the optimization server computer, the optimal value in a recommended set. Publishing the recommended set towards end-user computing devices configured to run the application.

20 Claims, 4 Drawing Sheets

Figure 1A:
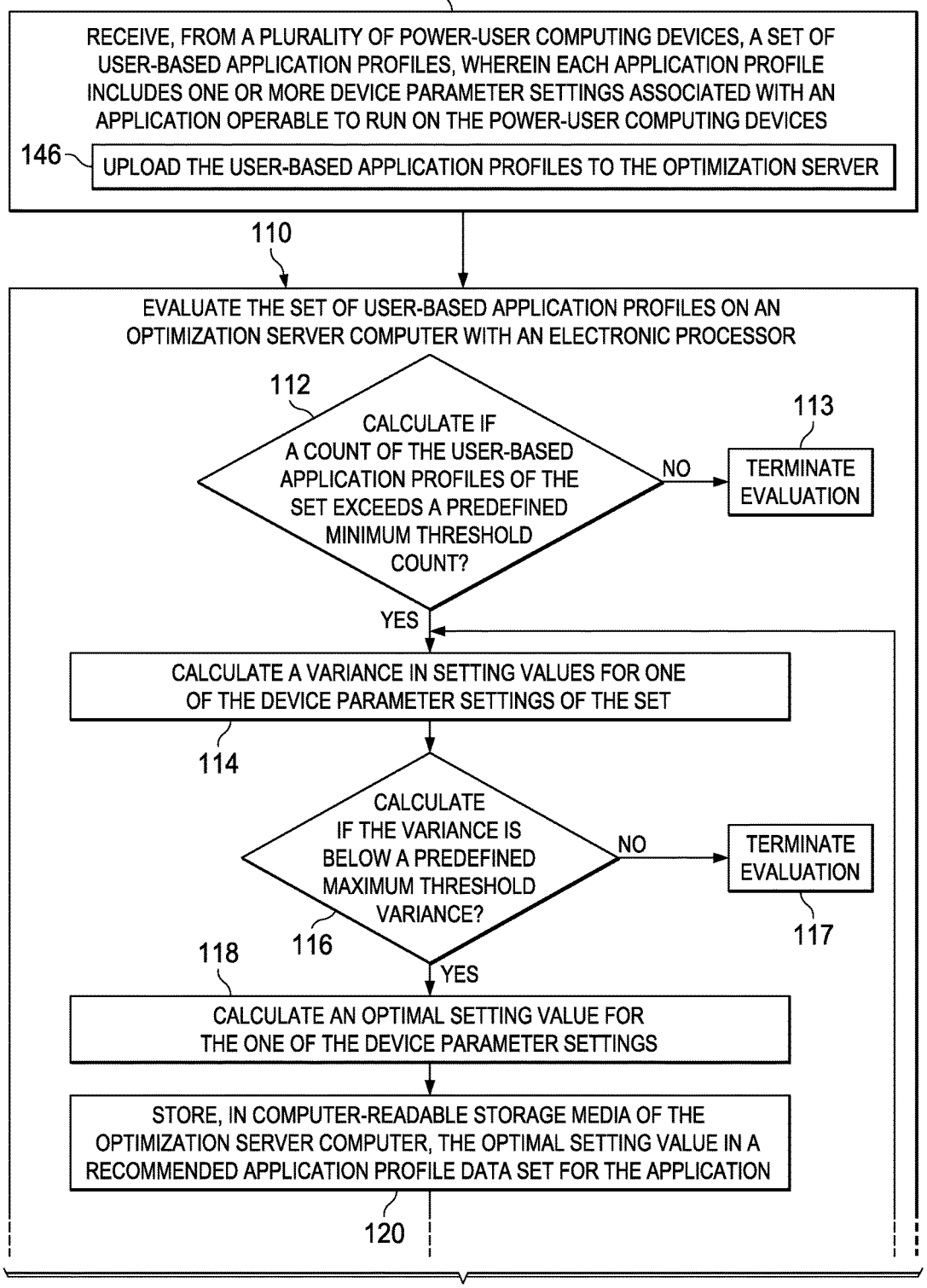

SYSTEM, METHOD AND DEVICE FOR PROVIDING CROWD-SOURCED, CLOUD-BASED CUSTOM TUNING FOR APPLICATIONS

TECHNICAL FIELD

This application is directed, in general, to tuning computing devices and, more specifically, to a system and method for providing crowd-sourced, cloud-based power and performance tuning of applications run on computing devices.

BACKGROUND

Computing devices, such as certain communication computing devices equipped with appropriate system-on-chip processors and operating system software, can facilitate the running of embodiments of special purpose computer programs known as applications or "apps". Often developers of the original equipment manufacture (OEM) provide application profiles for the computing device. Application profiles refer to a set of device operational state settings, or application parameters, that adjust, or tune, the performance and the power consumption of the device running a particular device-compatible application. The OEM-supplied application profiles may include a static set of application parameters provided for those applications existing at the time of the computing device's launch.

The OEM-supplied application profiles may be limited to a selected group of applications that are deemed critical to the device's basic functionality. However, such static OEM-supplied application profiles may not address new applications that are created or applications that are modified after the launch of the device. Static OEM-supplied application profiles also may not address non-mission-critical applications such as entertainment or educational applications.

SUMMARY

One aspect provides a method of optimizing computing device application profiles. The method can comprise receiving, from a plurality of power-user computing devices, a set of user-based application profiles, wherein each application profile includes one or more device parameter settings associated with an application operable to run on the power-user computing devices. The method also comprises evaluating the set of user-based application profiles on an optimization server computer with an electronic processor. The processor can be operable to calculate if a count of the user-based application profiles of the set exceeds a predefined minimum threshold count. The processor can be operable to calculate a variance in setting values for one of the device parameter settings of the set, if the count exceeds the minimum threshold count. The processor can be operable to calculate if the variance is below a predefined maximum threshold variance. The processor can be operable to calculate an optimal setting value for the one of the device parameter settings, if the variance is below the maximum threshold variance. The method can also comprise storing, in computer-readable storage media of the optimization server computer, the optimal setting value in a recommended application profile data set for the application. The method can also comprise publishing the recommended application profile data set towards a universe of end-user computing devices configured to run the application.

Another aspect provides a system for optimizing computing device application profiles. The system can comprise a communication interface device. The communication interface device can be configured to receive, from a plurality of power-user computing devices, a set of user-based application profiles, wherein each application profile includes one or more device parameter settings associated with an application operable to run on the power-user computing devices. The communication interface device can be configured to publish a recommended application profile data set for the application towards a universe of end-user computing devices configured to run the application. The system can also comprise an optimization server computer having an electronic processor. The processor can be operable to calculate if a count of the user-based application profiles of the set exceeds a predefined minimum threshold count. The processor can be operable to calculate a variance in setting values for one of the device parameter settings of the set, if the count exceeds a minimum threshold count. The processor can be operable to calculate if the variance is below a predefined maximum threshold variance. The processor can be operable to calculate an optimal setting value for the one of the device parameter settings, if the variance is below the maximum threshold variance. The processor can be operable to store, in computer-readable storage media of the optimization server computer, the optimal value in a recommended application profile data set.

Another aspect provides a computing device. The device can comprise computer-readable storage media containing computer-executable instructions for a settings application. The device can comprise an electronic processor which can be operable to execute the computer-executable instructions for the setting application. The processor can be operable to display, on a user interface of the computing device, a menu of device parameter settings associated with a user application operable to run on the computing device. The processor can be operable to store a user-based application profile on the computer-readable storage media, the user-based application profile including user-chosen setting values for the device parameter settings presented on the menu. The device also comprises a communication interface device. The interface device can be configured to receive a recommended application profile data set published by the optimization server computer, wherein the recommended application profile data set can be based on an evaluation of a set of user-based application profiles that includes the user-based application profile.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Figure 1B:
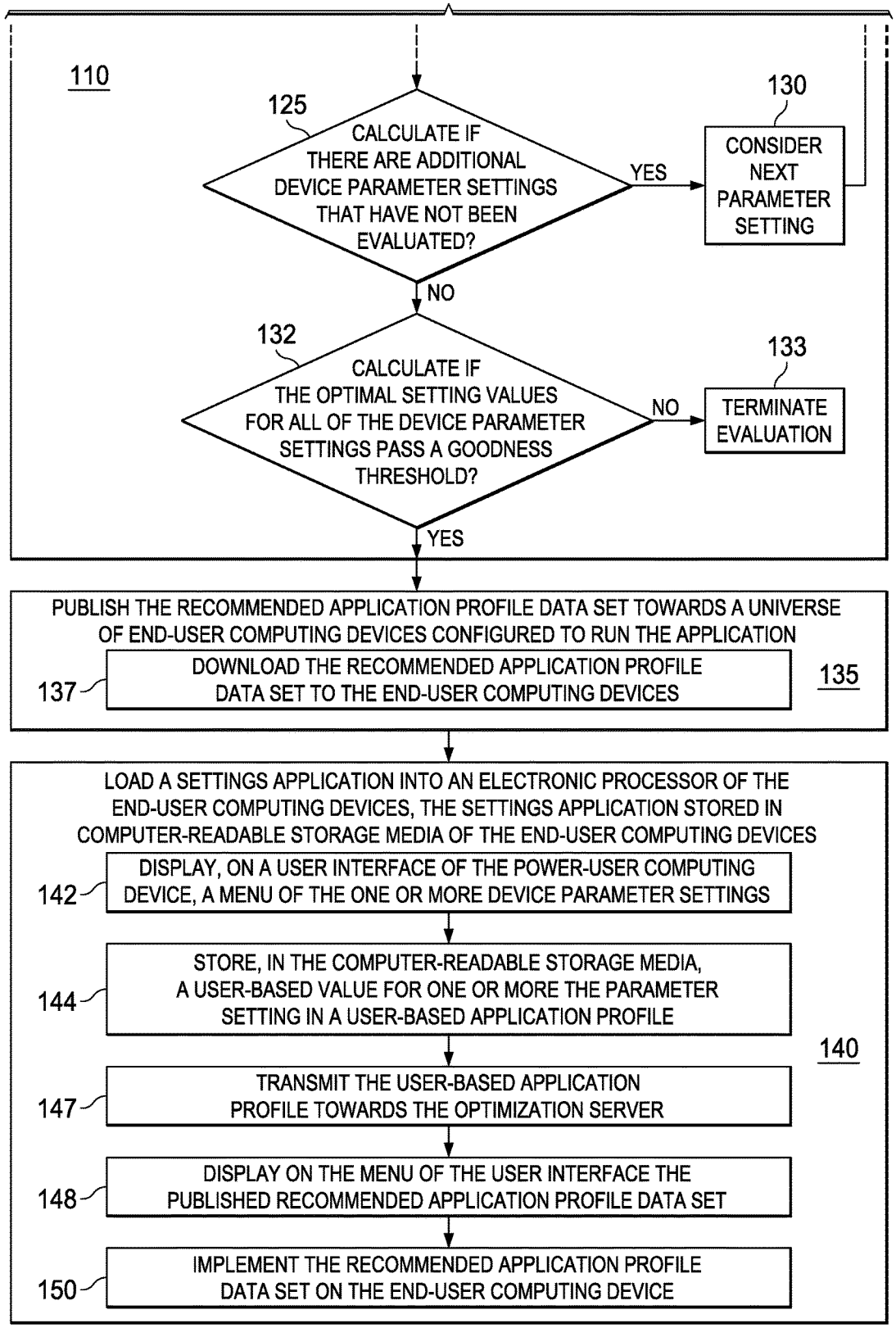

Reference is now made to the following descriptions taken in conjunction with the accompanying drawings, in which:

FIGS. 1A-1B presents a flow diagram of example embodiments of a method of optimizing computing device application profiles according to the principles of the present disclosure.

Figure 2:
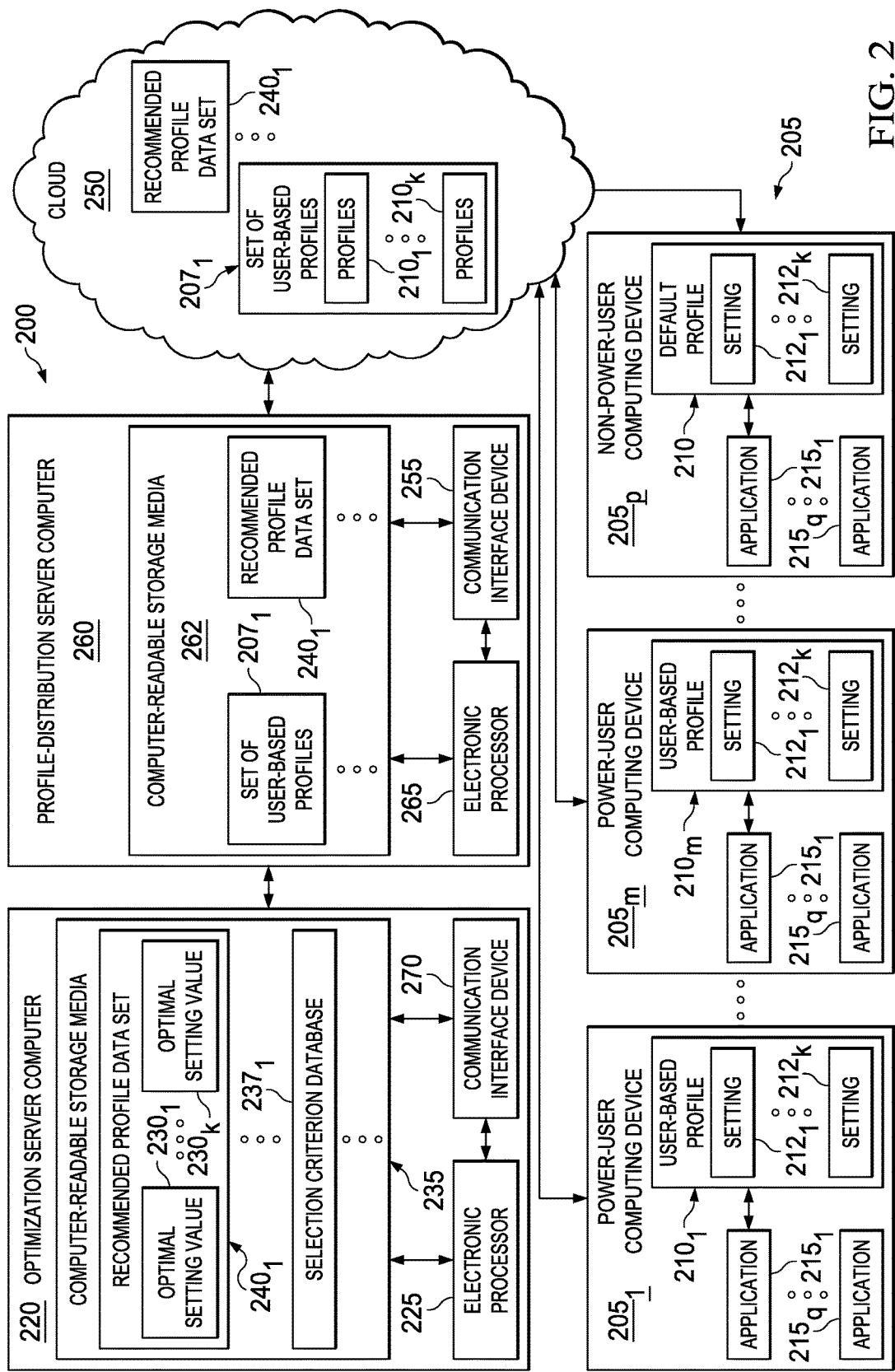
Figure 3:
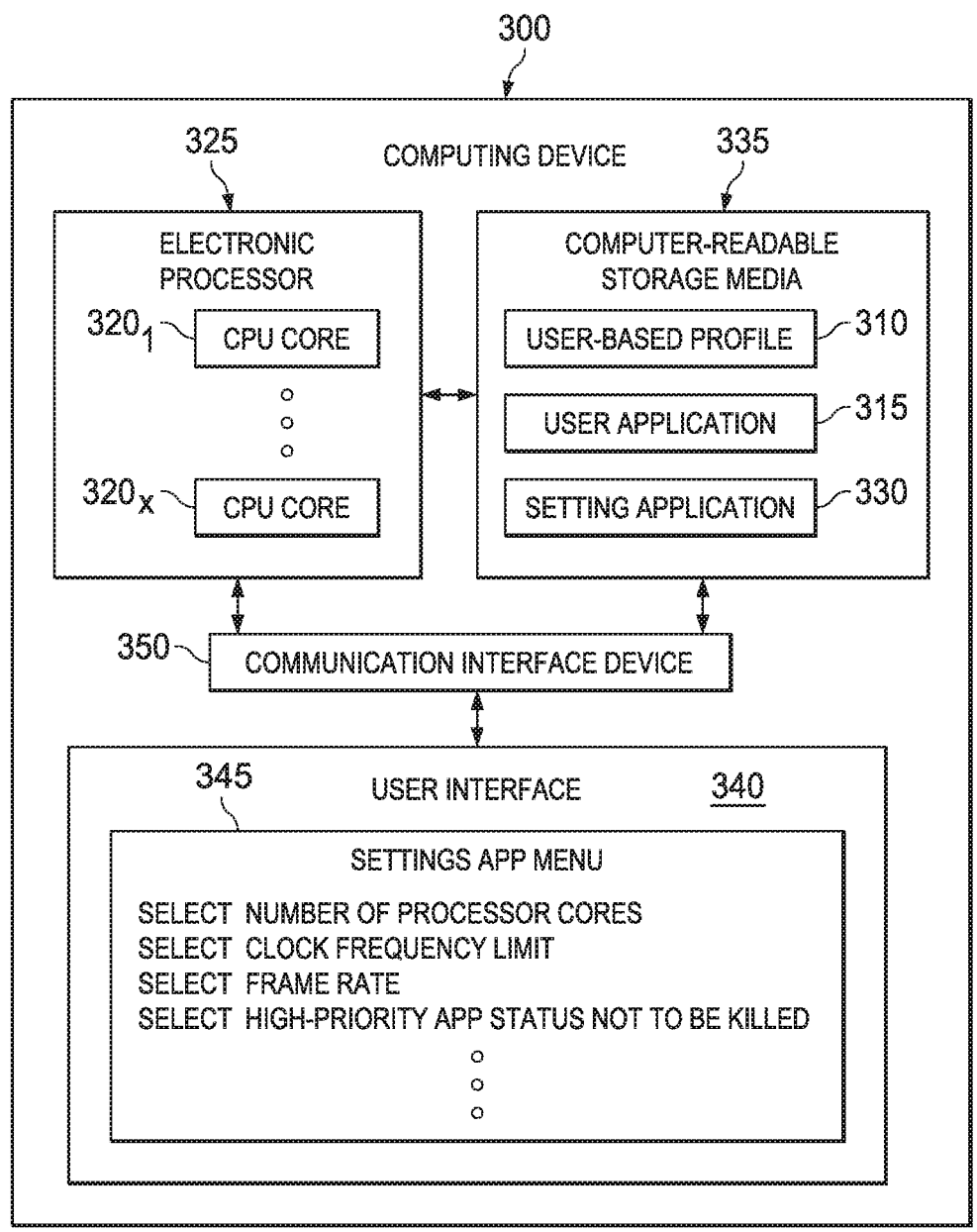

FIG. 2 illustrates a block diagram of example embodiments of a system for optimizing computing device application profiles constructed according to the principles of the present disclosure; and FIG. 3 illustrates a block diagram of example embodiments of a computing device constructed according to the principles of the present disclosure.

DETAILED DESCRIPTION

The system and method disclosed herein facilitate the automated sharing and distribution of application profiles for computing devices. In contrast to static manufacturer (e.g., OEM) provided application profiles, the application profiles are dynamically generated from a sub-group of end-users, e.g., power-users, who tune the parameter settings of a computing device. It was discovered that application profiles tuned by such a group, or crowd, of users can produce surprisingly rapid optimization in the performance and/or the power usage for combinations of devices and application, as compared to OEM-generated application profiles.

The efficacy of such crowd-sourced user-based tuning is counter-intuitive and is the opposite of traditional approaches where developers of the manufacturer optimize device parameters settings and then distribute those parameter settings to users. It was discovered that the combined experiences of even relatively small crowds of power-users, e.g., in some cases less than 10 percent or 1 percent of the total user base for a particular application, can provide a valuable but hitherto untapped information base to guide device parameter optimization.

As facilitated by the method, system and device embodiments disclosed herein, the user-sourced and user-based application profiles can be evaluated, and if meeting certain criteria, automatically and dynamically deployed for the benefit of a broader base of other non-power users of the same combination of devices and applications but who may not have themselves tuned the application. Additionally, the manufacturer gains insight into the combinations of applications and application profiles being run on their devices.

FIGS. 1A-1B presents a flow diagram of example embodiments of a method 100 of optimizing computing device application profiles according to the principles of the present disclosure. FIG. 2 illustrates a block diagram of example embodiments of a system 200 for optimizing computing device application profiles, and FIG. 3 illustrates a block diagram of example embodiments of a computing device 300, both constructed according to the principles of the present disclosure.

One embodiment is a method 100 of optimizing computing device application profiles. With continuing reference to FIGS. 1A-3, the method 100 comprises a step 105 of receiving, from a plurality of power-user computing devices (e.g., devices $205_1 \ldots 205_m$, device 300) a set 207 of user-based application profiles (e.g., profiles $210_1 \ldots 210_m$, profile 310). Each user-based application profile $210_1 \ldots 210_m$ includes one or more device parameter settings (e.g., settings $212_1 \ldots 212_k$) associated with an application (e.g., application $215_1$, 315) operable to run on the power-user computing devices $205_1 \ldots 205_m$, 300.

The computing devices 205 are not limited to a particular make or type. Embodiments of the computing devices 205 can include mobile devices, e.g., laptop computers, phones such a Smartphones, tablet computers, and, non-mobile devices, e.g., desktop computers, workstations or gaming consoles.

A power-user computing device refers to a computing device operated by a device user who has decided to modify an application profile associated with the application. The power-user computing devices $205_1 \ldots 205_m$ are part of a larger universe of end-user computing devices (e.g., computing devices $205_1 \ldots 205_p$) that can further include non-power-user computing devices (e.g., computing devices $205_{m+1} \ldots 205_p$) that are capable of running the application $215_1$, but, the users of such devices $205_{m+1} \ldots 205_p$ have not taken any action to create a user-based application profile 210 associated with the application $215_1$. Rather, such non-power-user computing devices $205_{m+1} \ldots 205_p$ may apply a default profile (e.g., a OEM provided profile) associated with the application $215_1$.

The method 100 can be applied to any number of applications $215_1 \ldots$ that are operable on the computing device 205, and, the method 100 is not limited to a particular type or category of application. Non-limiting examples of user applications include productivity applications, such as a word processor, spreadsheet, database manager or multimedia editor, or, entertainment applications, such as a game or a social interaction tool. For each application there can be different numbers of user-based application profiles (e.g., profiles $210_1 \ldots 210_m$, e.g., provided by different counts of power-user computing devices $205_1 \ldots 205_m$. Each application may have different numbers and types of device parameter settings $212_1 \ldots 212_k$ that the manufacture has made available to the power-users for modification.

The method 100 further comprises a step 110 of evaluating the set of user-based application profiles 207 on an optimization server computer 220 with an electronic processor 225 operable to perform a series of calculations that, provided certain conditions are met, generates an optimal setting value estimate for the device parameter settings $212_1 \ldots 212_k$ of the set 207.

The term electronic processor 225, as used herein, refers to one or more electronic circuits configured to execute commands in a series of electronic instructions, e.g., embodying a program to implement steps of the method 100. The electronic processor 225 can include one more central processing unit cores (e.g., cores $320_1 \ldots 320_x$) of the computing device. The electronic processor can include one or more integrated circuit chips, such as a system-on-chip (e.g., without limitation, an NVIDIA TEGRA system-on-chip), configured to carry out the instructions of the computer program to implement the method steps described herein.

One skilled in the art would be familiar with how computer programs stored in the computer-readable storage media of the optimization server computer can be implemented on the electronic processor of the optimization server to count profiles, apply parametric and non-parametric statistical procedures to calculate variance, calculate optimal setting values for the set of parameter settings, etc. . . . , such as disclosed herein. The computer-readable storage media is not limited to a particular type of non-transitory media. Examples of computer-readable storage media include digital memory including magnetic storage media such as a magnetic disks and magnetic tapes, hard drives, static random-access memory or optically readable digital data storage media.

As part of the evaluation step 110, the electronic processor 225 can be operable to calculate in step 112 if a count of the user-based application profiles of the set exceeds a predefined minimum threshold count. The minimum threshold count is set or defined to equal a high enough value to ensure that there is a sufficient number of user-based application profiles $210_1 \ldots 210_m$ in the set 207 to provide statistically reasonable estimates of variance of the parameter settings $212_1 \ldots 212_k$ as further discussed below. As non-limiting examples, in some embodiments, the minimum threshold count value may be defined to equal 20, or in some embodiments, defined to equal 100, or in some embodiments, defined to equal 1000.

If the count of m user-based application profiles 210 calculated in step 112 is not greater than the predefined minimum threshold count, then the evaluation of the profiles (step 110) is terminated at step 113. If the count of user-based application profiles 210 (e.g., m different profiles 210) calculated in step 112 is greater than the predefined minimum threshold count, then the evaluation proceeds to step 114.

As part of the evaluation step 110, if the count exceeds the minimum threshold count (per step 112), then the electronic processor 225 can be operable to calculate, in step 114, a variance in setting values for one of the device parameter settings (e.g., setting $212_1$) of the set 207.

As part of the evaluation step 110, the electronic processor 225 can calculate in step 116 if the variance is below a predefined maximum threshold variance. The maximum threshold variance is set or defined to equal a low enough value to ensure that the values for the particular device parameter setting under consideration from the set has localized to relatively narrow range and therefore are indicative of having found an optimized value for the setting. As non-limiting examples, in some embodiments, the maximum threshold variance value may be defined to equal ±10 percent or in some embodiments, ±50 percent, or in some embodiments, ±100 percent.

If the variance in setting values for the one device parameter setting (e.g., setting $212_1$) of the set 207 is not less than the predefined maximum threshold variance, then the evaluation can be terminated at step 117. If the variance is less than the predefined maximum threshold variance, then the evaluation for the one setting $212_1$ proceeds to step 118.

As part of the evaluation step 110, if the variance is below the maximum threshold variance (per step 116), then the electronic processor 225 can be made operable, in step 118, to calculate an optimal setting value for the one of the device parameter settings (e.g., optimal setting value $230_1$ for setting $212_1$).

After the completion of step 118, the electronic processor 225 can also be made operable, in step 120, to store, in computer-readable storage media 235 of the optimization server computer 220, the optimal setting value $230_1$ in a recommended application profile data set for the application (e.g., recommended profile data set $240_1$ for application $215_1$).

One skilled in the pertinent art would understand that values of the predefined minimum threshold count and the predefined maximum threshold variance can depend upon several factors. Non-limiting examples of such factors may include the particular device parameter settings that is being evaluated, the particular electronic processor installed on the computing device, the source of power being supplied to the computing device (e.g., battery versus non-battery grid power), and the particular application being run.

In some embodiments, the computer-readable storage media 235 of the optimization server 220 can further include one or more selection criterion data bases (e.g., data bases $237_1 \ldots$ ) which include predefined minimum threshold count and predefined maximum threshold variance values associated with different particular applications being run on the computing devices 205 (e.g., selection criterion data base $237_1$ associated with application $215_1$). In some embodiments, e.g., for a new application or an application not previously run on a particular type of computing device, or a new type of computing device, the predefined minimum threshold count and predefined maximum threshold variance may be based at least in part on feedback gained from the evaluation step 110, e.g. as applied to the present or similar types of device and application combinations.

In some embodiments, the electronic processor 225 can be programmed to retrieve the appropriate predefined minimum threshold count and predefined maximum threshold variance values for the set of user-based application profiles $207_1$ being evaluated in step 110. In some embodiments, the electronic processor 225 can be programmed to modify the predefined maximum threshold variance, e.g., to a larger value as compared to the values retrieved from the selection criterion data base 227, and/or, to repeat the evaluation (step 110) if a modified predefined minimum threshold count e.g., smaller, count of user-based application profiles is applied as compared to that retrieved from the selection criterion data base 227.

After the completion of storing step 120, the electronic processor 225 can be made operable to calculate, in step 125, if the set of user-based application profiles 207 has additional device parameter settings (e.g., additional ones of the settings $212_2 \ldots 212_k$) that have not been evaluated per step 110. If, in step 125, it is determined that there are additional parameters settings to evaluate, then in step 130 the next setting (e.g., setting $212_2$) is considered by the electronic processor 225 in accordance with steps 114-120. After the completion of step 120, the electronic processor 225 returns to step 125 and the evaluation continues in step 130 until all settings in the set (e.g., all k of the settings 212 in set 207) have been evaluated and optimal setting values $230_1 \ldots 230_k$ have been calculated for all of the device parameter settings in the set (e.g., all k of the settings 212 in set 207).

After optimal setting values 230 have been calculated for all of the device parameter settings 212 of the set 207, the method 100 can proceed to calculate, in step 132, if as a whole all of the optimal setting values 230 for the settings 210, passes a goodness threshold. As part of step 132, the electronic processor 225 can be programmed to be operable to calculate, in step 132, a goodness metric for each one of the settings 212 of the set 207. The goodness metric can include normalized values of the variances calculated for user-based values of the settings 212 as part of steps 114-120. In some embodiments, for instance, such normalized variance values for each setting 212 may range from 0 to 1. A normalized variance value equal to 0 may correspond to a poor candidate optimal setting value for a particular setting 212 where there is a high variance in the user-based values for the setting 212 (e.g., no single most common setting value for setting $212_1$ of the set 207). A normalized variance value equal to 1 may correspond to an ideal candidate optimal value for a particular setting 212 where there is low variance in the user-based values for the setting 210 in the set 207 (e.g., a single same setting value for the setting $212_1$ of the set 207). In some embodiments, the goodness metric can equal a sum or an average of the calculated normalized values of the variances of the settings 212. In some embodiments, the goodness metric can equal a weighted sum or a weighted average of the calculated normalized values of the variances of the settings 212. The weighting factor applied to each of the calculated normalized values of the variances may be made larger or smaller based upon the relative importance that a particular setting is expected to have on optimizing the performance or power utilization a device 205 running of the application of interest. For instance a setting 212 thought to have a more important influence on device performance or power utilization may be assigned a higher weighting factor than a weighting factor assigned to another setting thought to have a less important influence on device performance or power utilization.

If as part of step 132 the goodness metric is below a predefined goodness criterion, then the optimal setting values 230 for the settings 212 are considered to have passed the goodness threshold, at which point the method 100 proceeds to a publishing step 135. If the goodness metric is not below a predefined goodness criterion, the evaluation step 110 is terminated at step 134.

If the evaluation step 110 is terminated at any of steps 113, 117 or 133, the set of user-based application profiles 207 and any optimized setting values 230 for individual settings 212 for the profiles 210 are ignored. Such incompletely optimized settings 212 and profiles 210 are ignored to ensure that any recommended application profile data set 240 represents a single common optimization goal for an application among the power-user devices 205 that provided user-based application profiles 210 to the set 207. This, in turn, avoids situations where different power users may have completely different optimization goals for a particular application, e.g., tuning an application for best performance versus best battery life versus improved robustness.

The method 100 also comprises a step 135 of publishing the recommended application profile data set $240_1$ towards a universe of end-user computing devices 205. In some embodiments, the universe of end-user computing devices that the recommended application profile data set $240_1$ is published towards can include all of the power-user computing devices (e.g., devices $205_1 \ldots 205_m$) that provided the user-based application profiles 210 for the set 207, plus all of the non-power-user computing devices (e.g., devices $205_{m+1} \ldots 205_p$) which did not provide such profiles. In some embodiments, the universe of end-user computing devices 205 that the recommended application profile data set $240_1$ is published towards may include only those computing devices 205 that have been registered as a client of the server. As a non-limiting example, in some embodiments, the universe of end-user computing devices 205 toward which the recommended application profile data set $240_1$ is published may consist of subsets of power-user and non-power-user devices 205 that are registered as clients of the Geforce Experience Service.

In some embodiments, for instance, publishing the recommended application profile data set $207_1$ (step 135) can include publishing, by the optimization server 220, the recommended application profile data set $240_1$ towards the universe of the end-user computing devices 205 via a cloud 250 to facilitate communication between the universe of the end-user computing devices 205 and the optimization server 220.

One skilled in the art would be familiar with how data, such as the user-based application profiles and the recommended application profile data set, can be encoded, packetized and transmitted over a network of computing, storage and transmission devices (e.g., a cloud 250) to and from client devices (e.g., the computing devices 205) associated with a client server computer holding the data set. The Internet is one example of a cloud 250.

In some embodiments, the optimization server 220 can be configured as such a client server, while in other embodiments, to distribute memory and computational workload, the optimization server can be in communication with a profile-distribution server computer configured as such a client server.

For instance, in some embodiments, the user-based application profiles $210_1 \ldots 210_m$ of the set $207_1$ are received (e.g., as part of step 105) to a communication interface device 255 of a profile-distribution server computer 260 that is in cloud 250 communication with the power-user computing devices $205_1 \ldots 205_m$. The profile-distribution server 260 can be operable to store, on computer-readable storage media 262 of the profile-distribution server, the set of user-based application profiles 207 of power-user computing devices $205_1 \ldots 205_m$. The profile-distribution server 260 can be operable to transmit, from the computer-readable media 262 of the profile-distribution server, the set of user-based application profiles 207 to be received (e.g., as part of step 105) by the optimization server computer 220. In some embodiments, publishing (e.g., as part of step 135) can include transmitting the recommended application profile data set $240_1$ from the optimization server computer 220 to a profile-distribution server computer 260 in cloud 250 communication with the end-user computing devices 205.

In some embodiments of the method 100, the recommended application profile data set may be applied to provide parameter settings values for applications in addition to the target application from which the set of user-based application profiles 207 were developed for. That is, in some embodiments, publishing (e.g., as part of step 135) can include publishing the recommended application profile data base towards a universe of the end-user computing devices 205. For instance, the recommended application profile data set 240 may provide suitable settings for a new application (e.g., a new game) for which end-users and/or manufacturers still have little experience with, but which has similar operating characteristics (e.g., similar graphics display or computing requirements) as the target application.

In some embodiments, publishing (e.g., as part of step 135) can include, in step 137, downloading the recommended application profile data set $240_1$ to the end-user devices 205. For instance, in some embodiments, the electronic processor 325 of the computing device 300 can be programmed to cause the device 300 to download the recommended application profile data set $240_1$ from the optimization server computer 220 or the profile-distribution server computer 260. In some such embodiments to facilitate the downloading step 137, client end-user devices 205 can be programmed to periodically initiate communication (e.g., via the cloud 250) between the clients and server (e.g., the optimization server computer 220 or the profile-distribution server computer 260) and to query if a newly recommended application profile data set 240 is available for download.

The optimal value $230_1$ for the one device parameter setting $212_1$ can be calculated (step 118) in a number of different ways depending upon the type of device parameter being evaluated and the choices of setting made available on the power-user devices $205_1 \ldots 205_m$.

In some embodiments, calculating the optimal value $230_1$ (step 118) for the device parameter settings $212_1$ includes calculating a most-frequently selected setting value for the parameter setting $212_1$ among the set of user-based application profiles 207. In some embodiments, taking the most-frequently selected setting value as the optimal value may be advantageous when the device setting parameter choices are limited to a small group of categorical values (e.g., the number of central processing units among a total of two to four central processing units).

In some embodiments, calculating the optimal setting value (step 118) for the one device parameter settings $212_1$ includes calculating a median value of the values for the setting $212_1$ among the set of user-based application profiles 207. In some embodiments calculating the optimal value (step 118) for the one device parameter settings $212_1$ includes calculating an average value of the values for the setting $212_1$ among the set of user-based application profiles 207.

Using a median or average as the optimal setting value may be advantageous when the device setting parameter 212 choices include a large number of categorical or continuous values, such as a percentage of maximum clock frequency or maximum frame rate in 1, 5 or 10 percent increments.

A broad range of different device parameter settings 212 can be made available for adjustment on the computing devices 205 to facilitate optimization as part of the evaluation step 110. For instance, in some embodiments, the device parameter settings 212 include a setting for an upper number limit of central processing unit cores used by the power-user computing device running the application (e.g., CPU cores $320_1 \ldots 320_x$ where x≥2) of an electronic processor 325 of device 300 running application 315). For certain applications, reducing the number of central processing unit cores being used can reduce power utilization of the device and thereby prolong the powered operation of the device while running the application before, e.g., running out of battery power. For certain applications, providing a setting that uses the upper number limit of central processing unit cores can boost the device's performance thereby enhance the end-users experience running an application with high computational requirements (e.g., a game application).

For instance, in some embodiments the device parameter settings 212 can include a setting for a maximum central processing unit clock frequency for the power-user computing device running the application. For instance, in some embodiments a set of incremental values, corresponding to percentages the manufacturer's maximum recommended clock frequency, can be available for selection by the power-users. In some embodiments, the power-user may be allowed to select incremental values that are less than 100 percent (e.g., 25, 50 or 75 percent) of the manufacturer's maximum recommended clock frequency. That is, the central processing unit core or cores 320 can be down-clocked to facilitate lower rates of device power consumption and thereby prolong the duration of battery life of the computing device. In some embodiments, the power-user may be allowed to select incremental values that are greater than 100 percent (e.g., 110, 120, or 130 percent of the manufacturer's maximum recommended clock frequency). That is, the central processing unit core or cores 230 can be over-clocked to facilitate faster device performance to thereby enhance the user's experience running an application with high computational requirements.

For instance, in some embodiments the device parameter settings 212 includes a setting for a display frame-rate update limit or a display resolution of the power-user computing device running the application. For instance, in some embodiments a set of incremental values, correspond to a multiple or percentage of a maximum display frame-rate update limit and/or a maximum resolution, can be available for selection by the power-users. For instance, for applications with graphics-intensive requirements, the display frame-rate update limit and/or display resolution of the computing device can be incrementally decreased to facilitate lower rates of device power consumption, or incrementally increased, to boost the user's visual experience of the application.

For instance, in some embodiments the device parameter settings 212 include a setting (e.g., an on/off setting) for designating the application of interest as a high priority application. For example, often by default, all non-system applications can be eligible for getting killed (e.g., stopped and not automatically restarted) when the computing device 205 becomes resource-limited such as by running out of memory. By designating the application of interest as a high-priority application, the application can be made not eligible to be killed. For instance, while the power-user computing device 205 is running the application, the application will not be killed even when the computing device 205 is running out of memory.

Alternatively or additionally, in some embodiments the device parameter settings 212 include a setting to specify one or more low-priority application (e.g., applications $215_2 \ldots 215_q$) that are to not run while the power-user computing device is running the target application $215_1$ of interest. Including an application on the list of low-priority application causes the application to be killed when the application of interest is running. For example, some applications may be programmed to periodically activate and perform tasks that may consume energy and occupy the memory and logic processing circuits of the computing device. As non-limiting examples, instant messaging, news-feed or weather-reporting applications may run in background, that is, even while the application is closed, still consume power when the application instructs the computing device 205 to periodically download information (e.g., message, news or weather information from the cloud 250. Power consumption rates of the computing device may be lowered and/or computing device performance may be increased, by killing such low-priority applications while the application of interest is running.

In some embodiments, designating the application of interest as a high-priority application to not be killed can have advantages over designating other applications as low-priority applications because it permits other applications to continue doing background tasks that are important to the device user. For example, when the application of interest is a game application the device user may still want run other application in the background, e.g., to play music, or to capture and stream a video from the game application. In still other embodiments, however, it may be advantageous to implement a combination of designating the application of interest as a high-priority application and designating other applications as low-priority applications, e.g., when the user is certain that the other applications need not be running in the background.

In some embodiments, the method 100 may separately comprise or further include a step 140 of loading a settings application 330 into an electronic processor (e.g., processor 325) of the computing devices (e.g., device 300). The settings application (e.g., application 330) can be stored in the computer-readable storage media 335 of the power-user computing devices $205_1 \ldots 205_m$. Running the settings application 330 on the electronic processor can make the processor operable to, in step 142, display, on a user interface 340 of the power-user computing device, a menu 345 of the one or more device parameter settings $212_1 \ldots 212_k$ associated with the application 315. The electronic processor 325 can also be made operable to store, in step 144, in the computer-readable storage media 335, a user-based value chosen for one or more the device parameter settings $212_1 \ldots 212_k$ of the user-based application profile (e.g., profile $210_1$).

In some embodiments, the optimization server 220 can, as part of receiving step 105, automatically upload, in step 146, the user-based application profiles 210. For instance, in some embodiments, the electronic processor 225 of the optimization server 220 (or alternatively, the electronic processor 265 of the profile-distribution server computer 260) can be programmed to periodically query the computing devices 205 for the presence of newly stored user-based application profiles and, if present, to automatically upload the user-based application profiles 210. In such embodiments, to facilitate the downloading step 146 the server can initiate communication (e.g., via the cloud 250) between the server and the client end-user devices 205.

In other embodiments, however, the electronic processor 325 of the computing devices 300 can be programmed to cause the device 300 to transmit (e.g., upload), in step 147, the user-based application profile $210_1$ towards the optimization server computer 220 where the profile $210_1$ is received as part of step 105. In some such embodiments to facilitate the transmission step 147, client end-user devices 205 can initiate communication (e.g., via the cloud 250) between the clients and server (e.g., the optimization server 220 or the profile-distribution server computer 260).

There can be advantages in providing such a client-initiated communication protocol over a server-initiated communication protocol. For instance, the server does not need to keep track of and repeat communication attempts, when there is a failure to communicate with a client device, e.g., because of disruptions in the communication network or because a client device has been powered off. Additionally, the server does not need to maintain of a list of client devices that it needs to periodically attempt initiating communication with. Moreover, sometimes, a client-initiated communication protocol can be more easily implemented onto to existing internet architecture and protocols than a server-initiated communication protocol, which could, e.g., require adding an abstraction layer on top of the existing internet protocol.

One skilled in the pertinent art would understand how to implement the user-based application profile $210_1$ on a power-user computing device 205 such that, when run on the device 205, an operational state of the device 205 (e.g., a power consumption characteristic and/or a performance characteristic of the device) can be modified when running the application 215 associated with the profile $210_1$.

In some embodiments, loading the setting application 330 causes the electronic processor 325 to be operable on the end-user computing devices 205 to display, in step 148 on the menu 345 of the user interface 340, the published recommended application profile data set (e.g., the data set 240 published towards the universe of end-user computing devices in step 135). Displaying the recommended application profile data set 240 facilitates alerting the end-users to the availability of the data set 240 and may permit the end-user to opt to select or reject the data set 240 for implementation on the computing device, in step 150. For instance, although a power user's profile 210 may have contributed to the set of user based profiles 207, not all power users may opt to implement the recommended application profile data set 235 in favor of their own developed application profile settings.

Alternatively or additionally, in some embodiments, the optimal values of the recommended application profile data set 240 can be automatically implemented, in step 150, by the end-user computing device when the associated application is run, e.g., without the need for the user (e.g., a non-power user) to select the recommended application profile or take any deliberate action.

Another embodiment is a system 200 for optimizing computing device application profiles. Embodiments of the system 200 can be configured to implement any of the method steps discussed above in the context of FIGS. 1A-1B. With continuing reference to FIGS. 1A-3, the system 200 comprises a communication interface device 255 configured to receive a set of user-based application profiles 207. Each of the user-based application profiles 210 includes one or more device parameter settings 212 associated with an application 215 operable to run on the power-user computing devices 205. The communication interface device 255 can also be configured to publish a recommended application profile data set 240 for the application 215 towards a universe of end-user computing devices 205 configured to run the application.

To facilitate communication with the computing devices 205, the communication interface device 255 can include the necessary electronic circuitry and hardware to facilitate the transmission and reception of data via, for example, a communications network such as the cloud 250. In some embodiments, the communication interface device 255 can be in cloud communication with the power-user computing devices and the universe of end-user computing devices. The communication interface device 255 can be configured to communicate via wireless or wired connections. As non-limiting examples, the communication interface device 255 can be configured to communicate via communication protocols including, for example, networking protocols such as Ethernet, Wi-Fi or Internet protocols.

The system 200 further comprises an optimization server computer 220 having an electronic processor 225 operable to evaluate the set 207. The electronic processor 225 can be operable to calculate if a count of the user-based application profiles 210 of the set 207 exceeds a predefined minimum threshold count. The electronic processor 225 can be operable to calculate a variance in setting values for one of the device parameter settings, (e.g., to successively calculate variances in setting values each one of settings $212_1 \ldots 212_m$) of the set, if the count exceeds a predefined minimum threshold count. The electronic processor 225 can be operable to calculate if the variance is below a predefined maximum threshold variance. The electronic processor 225 can be operable to calculate an optimal value 240 for the one of the device parameter settings, if the variance is below the predefined maximum threshold variance. The electronic processor 225 can be operable to calculate a goodness metric for all of the optimal setting values in the recommended application profile data set, The electronic processor 225 can be operable to store, in computer-readable storage media 235 of the optimization server computer 220, the optimal value 235 in the recommended application profile data set 240.

In some embodiments, the system 200 can further include a profile-distribution server computer 260 and the communication interface device 255 can be part of the profile-distribution server computer 260. In such embodiments, the profile-distribution server computer 260 can have an electronic processor 265 operable to store, on the computer-readable storage media 262 of the profile-distribution server 260, the set of power-user application profiles 207. The electronic processor 265 may also be operable to transmit, from the computer-readable storage media 262, the set of power-user application profiles 207 to the optimization server computer 220 (e.g., from the communication interface device 255 to a communication interface device 270 of the optimization server computer 220). The electronic processor 265 may also be operable to receive, from the optimization server 220 (e.g., from the communication interface device 270 of the optimization server to the communication interface device 255 of the profile-distribution server) the recommended application profile data set 240. The electronic processor 265 may also be operable to store, on the computer-readable storage media 262 of the profile-distribution server 260, a recommended profiles data set 240.

In some embodiments, to facilitate publishing of the recommended profiles data set 240 the electronic processor 265 may also be operable to store the user-based application profiles and recommended application profile data set according to predefined categories, such as the computing device 300 operating system, the type electronic processor 325 (e.g., type of system-on-chip), the type of central processing unit core, graphical processing unit core etc. . . .

Alternatively, in some embodiments not having a separate profile-distribution server, the optimization server computer 220 and its electronic processor 225 and component parts (e.g., the electronic processor 225, the computer-readable storage media 235 and the communication interface device 270) can be operable to perform all of the tasks ascribed to the profile-distribution server computer 260.

Some embodiments of the system 200 can further include at least some of the computing devices 205. For instance, some embodiments of the system 200 can further include the power-user computing devices $205_1 \ldots 205_m$ in cloud 250 communications with the optimization server 220. The power-user computing devices $205_1 \ldots 205_m$ can be configured to transmit the set of user-based application profiles $210_1 \ldots 210_m$ towards the optimization server 220 and to receive the recommended application profile data set 240 via the cloud 250. Some embodiments of the system 200 can further include the end-user computing devices $205_1 \ldots 205_p$ in cloud 250 communications with the optimization server 220 and the end-user computing devices $205_1 \ldots 205_m$ configured to receive the recommended application profile data set 240 (e.g., via the cloud 250).

Another embodiment is a computing device 300. FIG. 3 illustrates a block diagram of an embodiment of a computing device 300 constructed according to the principles of the present disclosure. The device 300 depicted in FIG. 3 can be an embodiment of any of the computing devices 205 depicted in FIG. 2. As discussed in the context of FIGS. 1A-2, embodiments of device 300 can be configured to implement steps in the method 110 (e.g., steps 140-150), and the device 300 can be part of some embodiments of the system 200. In some embodiments, the computing device 300 can be a mobile computing device, such as any of the mobile computing devices discussed in the context of FIGS. 1A-1B.

With continuing reference to FIGS. 2-3, the computing device 300 comprises computer-readable storage media 335, an electronic processor 325, user interface 340 and communication interface device 350.

The computer-readable storage media 335 contains computer-executable instructions for a settings application 330. The electronic processor (e.g., processor 225, 335, FIG. 2-3) can be operable to execute the computer-executable instructions to display, on the user interface 340, a menu 345 of device parameter settings $212_1 \ldots 212_k$ associated with a user application 315 (e.g., a productivity or entertainment application) operable to run on the computing device 300. The electronic processor (e.g., processor 225, 335, FIG. 2-3) can also be operable to execute the computer-executable instructions to store a user-based application profile (e.g., profile 210, 310, FIGS. 2-3; one of profiles $210_1 \ldots 210_m$) on the computer-readable storage media 335. The user-based application profile 210 includes user-chosen values for the device parameter settings $212_1 \ldots 212_k$ presented on the menu 345.

The communication interface 350 can be configured to receive a recommended application profile data set 240 published by the optimization server computer. The recommended application profile data set 240 can be based on an evaluation such as discussed in the context of FIGS. 1A-1B (e.g., step 110) of a set of user-based application profiles 207 that includes the user-based application profile 210. The communication interface device 350 can have properties similar to the communication interface device 255 discussed in the context of FIG. 2.

As discussed above in the context of FIGS. 1A-1B (e.g., in step 146), in some embodiments an optimization server 220, or profile-distribution server 260, can be programmed to automatically upload the user-based application profiles 210 from the devices 205 (e.g., the power-user computing devices $205_1 \ldots 205_m$).

In other embodiments, however, instead of allowing such automatic remote access to the devices 205 the electronic processor 325 of the devices 205 can be programmed to execute computer-executable instructions to cause the communication interface device 350 to transmit (e.g., in step 147) the user-based application profile 210 towards the optimization server 220 or profile-distribution server 260.

Those skilled in the art to which this application relates will appreciate that other and further additions, deletions, substitutions and modifications may be made to the described embodiments.

What is claimed is:

1. A method of optimizing computing device application profiles, comprising:
  receiving, from a plurality of power-user computing devices, a set of user-based application profiles, wherein each user-based application profile includes one or more device parameter settings associated with an application operable to run on the power-user computing devices;
  evaluating the set of user-based application profiles on an optimization server computer with an electronic processor operable to:
    calculate if a count of the user-based application profiles of the set exceeds a predefined minimum threshold count;
    calculate a variance in setting values for one of the device parameter settings of the set, if the count exceeds the minimum threshold count;
    calculate if the variance is below a predefined maximum threshold variance; and
    calculate an optimal setting value for the one of the device parameter settings, if the variance is below the maximum threshold variance;
  storing, in computer-readable storage media of the optimization server computer, the optimal setting value in a recommended application profile data set for the application; and
  publishing the recommended application profile data set towards a universe of end-user computing devices configured to run the application.

2. The method of claim 1, wherein the set of user-based application profiles are received to a communication interface device of a profile-distribution server computer that is in cloud communication with the power-user computing devices and wherein the profile-distribution server computer is operable to:
store, on computer-readable media of the profile-distribution server computer, a database including the set of user-based application profiles, and
transmit, from the computer-readable media of the profile-distribution server computer, the set of user-based application profiles to the optimization server computer.

3. The method of claim 1, wherein publishing includes transmitting the recommended application profile data set from the optimization server computer to a profile-distribution server computer in cloud communication with the end-user computing devices.

4. The method of claim 1, wherein the device parameter settings includes a setting for an upper number limit of central processing unit cores used by the power-user computing device running the application.

5. The method of claim 1, wherein the device parameter settings includes a setting for a maximum central processing unit clock frequency of the power-user computing device running the application.

6. The method of claim 1, wherein the device setting parameters includes a setting for a display frame-rate update limit of the power-user computing device running the application.

7. The method of claim 1, wherein the device setting parameters includes a setting for a display resolution limit of the power-user computing device running the application.

8. The method of claim 1, wherein the device setting parameters includes a setting specifying the application to be designated as a high-priority application that is not eligible to be killed while the power-user computing device is running the application.

9. The method of claim 1, wherein calculating the optimal setting value for the one device parameter setting includes calculating a most-frequently selected value for the parameter setting among the set of user-based application profiles.

10. The method of claim 1, wherein calculating the optimal setting value for the one device parameter setting includes calculating a median value for the parameter setting among the set of user-based application profiles.

11. The method of claim 1, wherein calculating the optimal setting value for the one device parameter setting includes calculating an average value for the parameter setting among the set of user-based application profiles.

12. The method of claim 1, wherein evaluating the set of user-based application profiles further includes calculating, on the electronic processor, a goodness metric for all of the optimal setting values in the recommended application profile data set, wherein the goodness metric includes normalized values of the variance in the setting values.

13. The method of claim 1, further including
loading a settings application into an electronic processor of the end-user computing devices, the settings application stored in computer-readable storage media of the end-user computing devices, whereby the electronic processor is operable to:
display, on a user interface of the end-user computing devices, a menu of the one or more device parameter settings associated with the application; and
store, in the computer-readable storage media, the user-based setting value chosen for the one or more device parameter settings in one of the user-based application profiles.

14. The method of claim 13, wherein the settings application is operable on the end-user computing devices to display, on the menu of the user interface, the recommended application profile data set.

15. A system for optimizing computing device application profiles, comprising:
a communication interface device configured to:
receive, from a plurality of power-user computing devices, a set of user-based application profiles, wherein each of the user-based application profiles includes one or more device parameter settings associated with an application operable to run on the power-user computing devices, and
publish a recommended application profile data set for the application towards a universe of end-user computing devices configured to run the application; and
an optimization server computer having an electronic processor operable to:
calculate if a count of the user-based application profiles of the set exceeds a predefined minimum threshold count;
calculate a variance in setting values for one of the device parameter settings of the set, if the count exceeds a minimum threshold count;
calculate if the variance is below a predefined maximum threshold variance;
calculate an optimal setting value for the one of the device parameter settings, if the variance is below the maximum threshold variance; and
store, in computer-readable storage media of the optimization server computer, the optimal setting value in the recommended application profile data set.

16. The system of claim 15, wherein the communication interface device is in cloud communication with a plurality of end-user computing devices.

17. The system of claim 16, wherein the communication interface device is part of a profile-distribution server computer of the system, the profile-distribution server computer having an electronic processor operable to:
store, on computer-readable storage media of the profile-distribution server computer, the set of power-user application profiles,
transmit, from the power-user profiles database, the set of power-user application profiles to the optimization server computer,
receive, from the optimization server computer the recommended application profile data set, and
store, on the computer-readable storage media of the profile-distribution server computer, the recommended profiles data set.

18. The system of claim 15, further including the power-user computing devices in cloud communications with the optimization server computer, wherein the power-user computing devices are configured to transmit the set of user-based application profiles towards the optimization server computer and receive the recommended application profile data set.

19. A computing device, comprising:
computer-readable storage media containing computer-executable instructions for a settings application;
an electronic processor which is operable to execute the computer-executable instructions for the setting application to:

display, on a user interface of the computing device, a menu of device parameter settings associated with a user application operable to run on the computing device, and store a user-based application profile on the computer-readable storage media, the user-based application profile including user-chosen setting values for the device parameter settings presented on the menu; and a communication interface device, configured to:

receive a recommended application profile data set published by an optimization server computer, wherein the recommended application profile data set is based on an evaluation of a set of user-based application profiles that includes the user-based application profile, wherein a communication interface device of the optimization server computer is configured to:

receive, from a plurality of power-user computing devices, a set of the user-based application profiles, wherein each of the user-based application profiles includes one or more of the device parameter settings associated with the user application operable to run on the power-user computing devices, and publish the recommended application profile data set for the user application towards the computing device; and the optimization server computer has an electronic processor operable to:

calculate if a count of the user-based application profiles of the set exceeds a predefined minimum threshold count;

calculate a variance in setting values for one of the device parameter settings of the set, if the count exceeds a minimum threshold count;

calculate if the variance is below a predefined maximum threshold variance;

calculate an optimal setting value for the one of the device parameter settings, if the variance is below the maximum threshold variance, and store, in computer-readable storage media of the optimization server computer, the optimal setting value in the recommended application profile data set.

20. The computing device of claim 19, wherein the computing device is a mobile communication computing device.

* * * * *